(12) United States Patent
Wilenski et al.

(10) Patent No.: US 8,490,348 B2
(45) Date of Patent: *Jul. 23, 2013

(54) VARIED GLASS DENSITY REINFORCEMENT OF COMPOSITES

(75) Inventors: Mark S. Wilenski, Seattle, WA (US); Alan M. Markus, Lake Forest, CA (US); Larry A. Godby, North Hills, CA (US)

(73) Assignee: The Boeing Company, Chicago, IL (US)

( * ) Notice: Subject to any disclaimer, the term of this patent is extended or adjusted under 35 U.S.C. 154(b) by 110 days.

This patent is subject to a terminal disclaimer.

(21) Appl. No.: 12/851,687

(22) Filed: Aug. 6, 2010

(65) Prior Publication Data

US 2010/0316859 A1    Dec. 16, 2010

Related U.S. Application Data

(62) Division of application No. 12/234,630, filed on Sep. 20, 2008, now Pat. No. 7,790,277.

(51) Int. Cl.
*B32B 17/00* (2006.01)

(52) U.S. Cl.
USPC ....... 52/204.5; 428/411.1; 428/417; 428/415; 428/412

(58) Field of Classification Search
USPC ........... 52/210–213, 204.5, 782.1; 428/297.4, 428/293.4, 113–114, 412, 417, 474.4, 411.1, 428/415, 426, 423.1
See application file for complete search history.

(56) References Cited

U.S. PATENT DOCUMENTS

| | | | |
|---|---|---|---|
| 4,338,233 A | | 7/1982 | Das et al. |
| 5,023,461 A | * | 6/1991 | Nakazawa et al. ......... 250/484.4 |
| 5,194,111 A | * | 3/1993 | Meatto ........................ 156/166 |
| 5,344,866 A | | 9/1994 | Hall |
| 5,629,074 A | * | 5/1997 | Klocek et al. ................. 428/212 |
| 5,665,450 A | * | 9/1997 | Day et al. ...................... 428/114 |
| 6,011,111 A | | 1/2000 | Brennan et al. |
| 7,531,583 B2 | | 5/2009 | Desai |
| 7,790,277 B2 | * | 9/2010 | Wilenski et al. ........... 428/293.4 |
| 2002/0052440 A1 | | 5/2002 | Tochioka et al. |

(Continued)

FOREIGN PATENT DOCUMENTS

| | | |
|---|---|---|
| EP | 0232503 A2 | 8/1987 |
| EP | 0338919 A2 | 10/1989 |

(Continued)

OTHER PUBLICATIONS

PCT search report dated Dec. 1, 2010 regarding application PCT/US2009/057494, filing date Sep. 18, 2009, applicant The Boeing Company, 12 Pages.

(Continued)

*Primary Examiner* — Jeanette E. Chapman
(74) *Attorney, Agent, or Firm* — Yee & Associates, P.C.

(57) ABSTRACT

A transparent reinforced composite material. An illustrative embodiment of the reinforced composite material includes a polymeric matrix, at least one low-density region including a first plurality of glass elements having a first packing density provided in the polymeric matrix and at least one high-density region including a second plurality of glass elements having a second packing density greater than the first packing density provided in the polymeric matrix. A method for reinforcing a composite material is also disclosed.

6 Claims, 3 Drawing Sheets

U.S. PATENT DOCUMENTS

| | | |
|---|---|---|
| 2002/0115748 A1 | 8/2002 | Lee et al. |
| 2003/0072933 A1 | 4/2003 | Moore et al. |
| 2006/0270760 A1 | 11/2006 | Desai |
| 2007/0096083 A1 | 5/2007 | Raravikar et al. |
| 2008/0167415 A1* | 7/2008 | Stoeppelmann et al. ..... 524/494 |
| 2009/0068453 A1* | 3/2009 | Chung .......................... 428/337 |

FOREIGN PATENT DOCUMENTS

| | | |
|---|---|---|
| EP | 0570632 A1 | 11/1993 |
| WO | WO0202686 A2 | 1/2002 |
| WO | WO2005066244 A2 | 7/2005 |
| WO | WO2007121780 A1 | 11/2007 |
| WO | WO2010033814 A1 | 3/2010 |

OTHER PUBLICATIONS

USPTO non-final office action dated Feb. 18, 2010 regarding U.S. Appl. No. 12/234,630, 8 Pages.

USPTO notice of allowance dated Jun. 17, 2010 regarding U.S. Appl. No. 12/234,630, 6 Pages.

* cited by examiner

VARIED GLASS DENSITY REINFORCEMENT OF COMPOSITES

This application is a divisional of application Ser. No. 12/234,630, filed Sep. 20, 2008, now U.S. Pat. No. 7,790,277, issued Sep. 7, 2010.

BACKGROUND INFORMATION

1. Field

The disclosure relates to composites. More particularly, the disclosure relates to composites having regions of varying glass fiber or ribbon density to reinforce the structural performance of the composites.

2. Background

The strength and stiffness of optical composite materials may be a function of the quantity and strength of the glass fiber or ribbon in the materials. The degree of optical distortion may be a function of the quantity of glass in the material. Ultimately, the quantity of glass that is acceptable for many applications may be limited by the optical performance of the system. Therefore, an alternate method of improving the strength and stiffness of composite materials may be desirable.

SUMMARY

The disclosure is generally directed to a reinforced composite material. An illustrative embodiment of the reinforced composite material includes a polymeric matrix, at least one low-density region including a first plurality of glass elements having a first packing density provided in the polymeric matrix and at least one high-density region including a second plurality of glass elements having a second packing density greater than the first packing density provided in the polymeric matrix.

The disclosure is further generally directed to a structural window. An illustrative embodiment of the structural window includes a composite material having a window border and comprising a polymeric matrix, at least one low-density region including a first plurality of glass elements having a first packing density provided in the polymeric matrix and at least one high-density region including a second plurality of glass elements having a second packing density greater than the first packing density provided in the polymeric matrix.

The disclosure is further generally directed to a method for reinforcing a composite material. An illustrative embodiment of the method includes providing a polymeric matrix resin, providing at least one low-density region including a plurality of glass elements having a first packing density in the polymeric matrix resin, providing at least one high-density region including a plurality of glass elements having a second packing density greater than the first packing density in the polymeric matrix resin and curing the polymeric matrix resin.

DETAILED DESCRIPTION

The disclosure is generally directed to composite materials having regions of varying glass fiber or ribbon density to reinforce the structural strength, stiffness, and/or ballistic capability of the composite materials while retaining good optical or other performance. In some illustrative embodiments, the composite material may include a polymeric matrix which may be optically transparent and has at least one low-density region and at least one high-density region. Each low-density region may include glass fibers or ribbons having a first packing density. Each high-density region may include glass fibers or ribbons having a second packing density which is greater than the packing density of the glass fibers/ribbons in the low-density region. The greater packing density of the glass fibers/ribbons in the high-density region or regions, relative to the relatively lower packing density of the glass fibers/ribbons in the low-density region or regions, may reinforce the structural performance of the composite material and enhance the stiffness, mechanical strength, ballistic strength, or other characteristics of the composite material while maintaining the optical clarity of the low-density region. The shape of each low-density region may be square, rectangular, diamond-like, or any other polygon. Furthermore, there may exist a gradient of density of the glass fibers/ribbons between each low-density region and each high-density region. The percentage of the high-density regions to the low-density regions may be within the range of about 10% to about 90%. Each high-density region may be oriented in a manner to maximize structural load carrying capability. The size, shape, and quantity of the glass elements in each high-density region may be selected to maximize ballistic performance. The glass elements in each high-density region may be a different shape or glass composition from the glass elements in each low-density region, and may be chosen for different optical, ballistic, or mechanical performance. Additional regions comprising glass fibers varying in density between the glass elements of the low-density region and the glass elements of the high-density region may be provided in the composite material.

Figure 1:
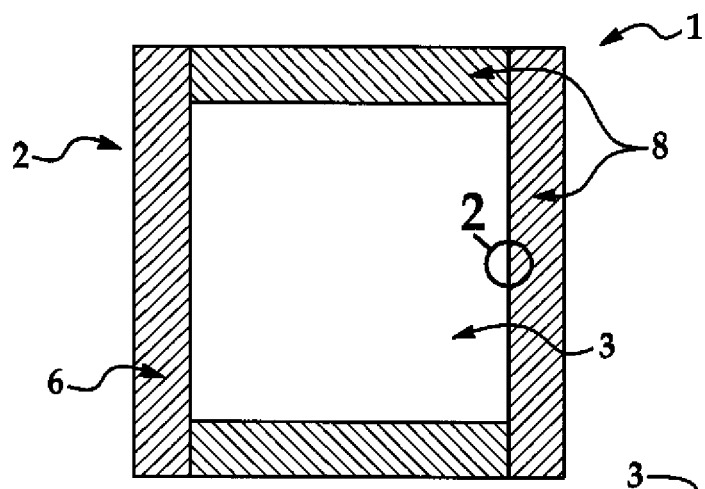
FIG. 1 is a front view of an illustrative structural window which includes a composite having an inner low-density region of glass fibers or ribbons and an outer high-density region of glass fibers or ribbons.

Referring initially to FIGS. 1-6, a structural window 1 which includes a composite material 6 that may be optically transparent and has regions of varying glass fiber and/or ribbon packing density is shown. The structural window 1 may include a window border 2 having a generally elongated, rectangular shape, as shown in FIG. 1, or any suitable alternative shape. It will be appreciated by those skilled in the art that the structural window 1 serves as one example of an application which is suitable for the composite material 6 and that other uses for the composite material 6 may be contemplated.

Figure 7:
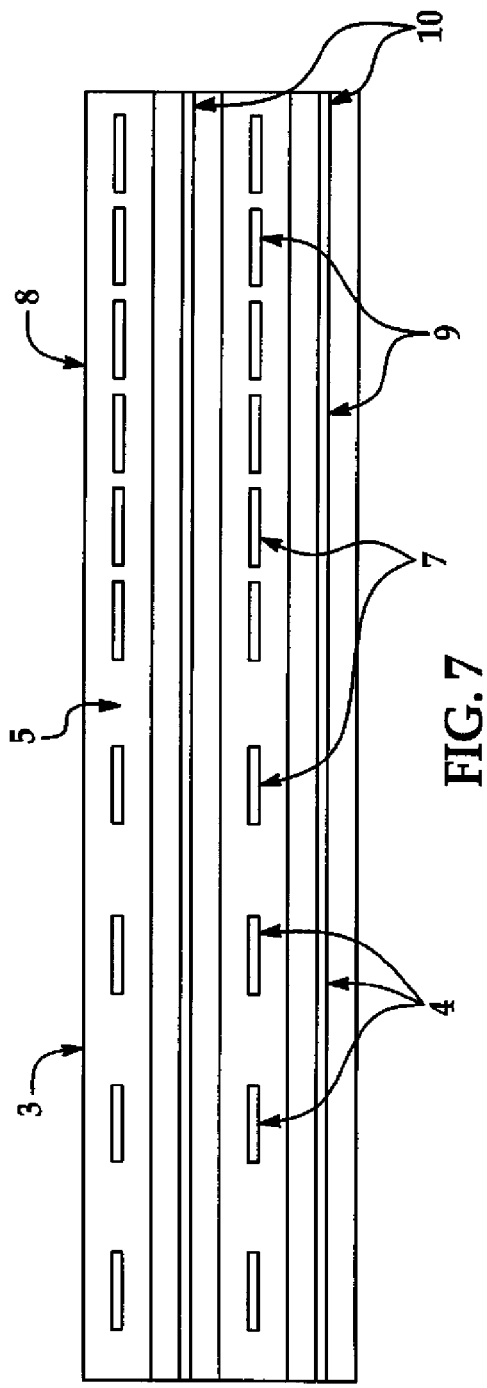
FIG. 7 is a transverse sectional view of a portion of the structural window shown in FIG. 1, with the glass fibers/ribbons in the low-density and high-density regions embedded in a polymeric matrix.

As shown in FIG. 7, the composite material 6 may include a polymeric matrix 5 which may be optically transparent (capable of transmitting light in the 380-700 nm range) or alternatively, may be capable of transmitting light in other wavelength ranges (such as 700-1000 nm, for example and without limitation). The polymer of the polymeric matrix 5 may be any type of polymer which is suitable for fabrication of transparent and other composite materials, including but not limited to epoxy; polymethyl methacrylate (acrylic); polycarbonate; and transparent polymers.

As shown in FIG. 1, the composite material 6 may include at least one low-density region 3 and at least one high-density region 8. Each high-density region 8 may be generally adjacent to a low-density region 3. In the structural window 1 which is shown in FIG. 1, in some embodiments the low-density region 3 may be located centrally relative to the high-density region 8, with the high-density region 8 defining the window border 2. Alternatively, in some embodiments the low-density region 3 may be located outwardly of the high-density region 8 of an alternative illustrative embodiment of the structural window 1. The number and locations of the low-density region or regions 3 and the high-density region or regions 8 throughout the composite material 6 may vary depending on the desired application of the composite material 6 as shown in FIGS. 2-6, where the pattern, orientation, and relative amount of each region is varied.

Figure 2:
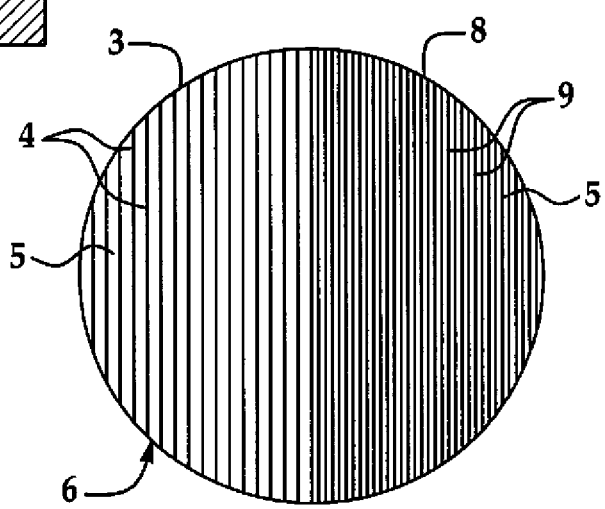
FIG. 2 is an enlarged sectional view, taken along section line 2 in FIG. 1, illustrating multiple glass fibers/ribbons in the low-density region and multiple glass fibers/ribbons of greater packing density in the high-density region of the composite material, with the glass fibers/ribbons in the high-density region oriented in generally parallel relationship with respect to the glass fibers/ribbons in the low-density region.
Figure 3:
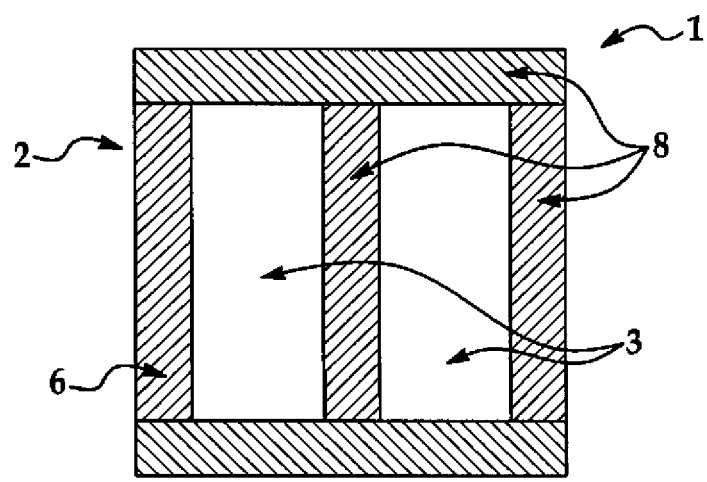
FIG. 3 is an alternate front view of an illustrative structural window which includes a composite having two inner low-density regions of glass fibers or ribbons and a bordering high-density region of glass fibers or ribbons.

As shown in FIGS. 2 and 7, each low-density region 3 of the composite material 6 may include multiple glass elements 4 and 9, where these elements may have different orientations to one another. For example, in FIG. 7, elements 7 are oriented out of the page, while elements 10 are oriented across the page. The glass elements 4 and 9 may be glass fibers and/or glass ribbons, for example and without limitation. Each high-density region 8 of the composite material 6 may include multiple glass elements 9 which may be glass fibers and/or glass ribbons, for example and without limitation. The glass elements 9 may be oriented in generally parallel relationship with respect to each other. The packing density of the glass elements 9 in each high-density region 8 may be greater than the packing density of the glass elements 4 in each low-density region 3.

As shown in FIG. 7, the glass elements 4 and the glass elements 9 may be embedded in or extend through the low-density region 3 and the high-density region 8, respectively, of the composite material 6. Furthermore, the relative packing density in each region may be formed by variation of packing density in the plane of the composite material 6, as shown in FIG. 7, and/or it may be formed by appropriate stacking of layers with different fiber densities through the thickness of composite material 6.

The delineation between high and low density regions may be abrupt as shown in FIG. 7, or may be done using a gradient, where the density varies gradually over a specific distance.

As shown in FIG. 2, in some embodiments the glass elements 9 of the high-density region 8 may be oriented in generally parallel relationship with respect to the glass elements 4 of the low-density region 3.

Figure 4:
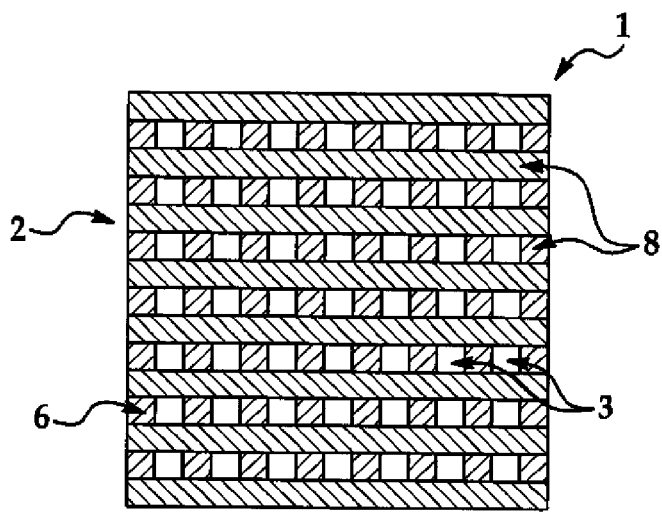
FIG. 4 is another alternate front view of an illustrative structural window which includes a composite having many inner low-density regions of glass fibers or ribbons and bordering high-density regions of glass fibers or ribbons.
Figure 5:
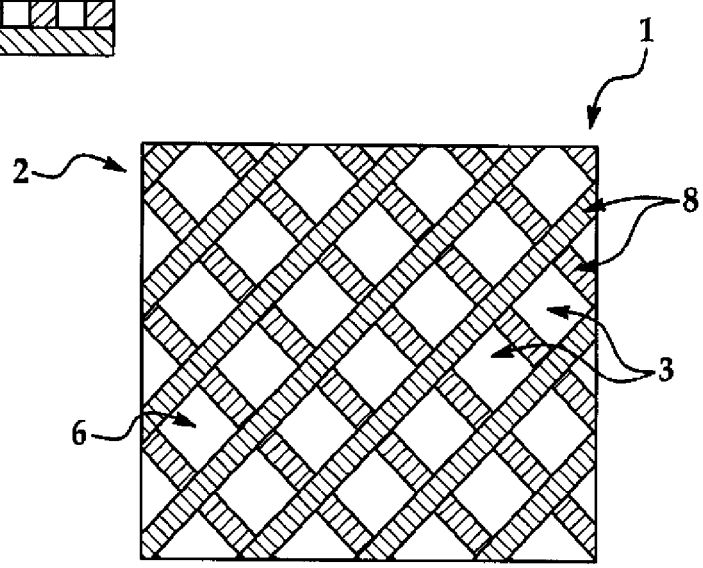
FIG. 5 is yet another alternate front view of an illustrative structural window which includes a composite having many inner low-density regions of glass fibers or ribbons and bordering high-density regions of glass fibers or ribbons, where the high density regions are oriented at 45 degrees and the area covered by low density regions represents a higher percentage of the viewable area.
Figure 6:
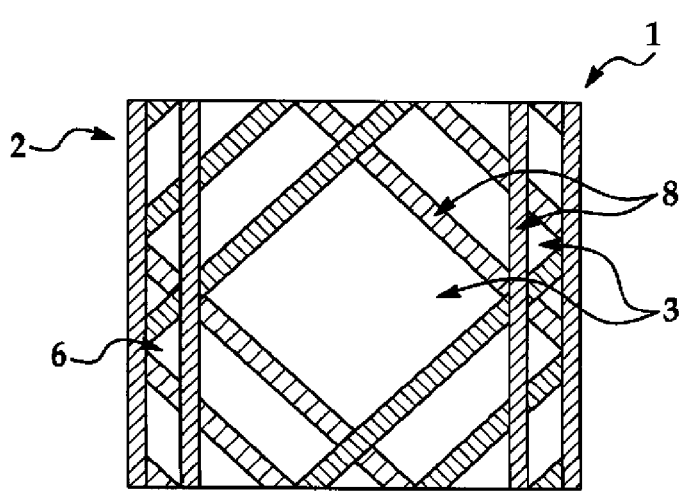
FIG. 6 is still another alternate front view of an illustrative structural window which includes a composite having many inner low-density regions of glass fibers or ribbons and bordering high-density regions of glass fibers or ribbons, where the high density regions are oriented at both 45 degrees and 90 degrees and the area covered by low density regions includes both a larger central region, and many smaller regions.

FIGS. 4-6 show alternate configurations where there are multiple high and low density regions in the composite material 6. The ratio of the area of high density regions to low density regions in the composite material 6 can be varied from approximately 10% to 90%, as desired for a specific application.

In typical application, the composite material 6 may be used as part of a structural window 1, which may be used in aerospace applications, transportation, ballistics, armor and architecture, for example and without limitation. The high-density region 8 having the glass elements 9 of relatively high packing density reinforces the structural strength of the composite material 6 and enhances the stiffness, mechanical strength, ballistic strength, or other characteristics of the composite material 6 while maintaining the optical clarity of the low-density region 3.

Figure 8:
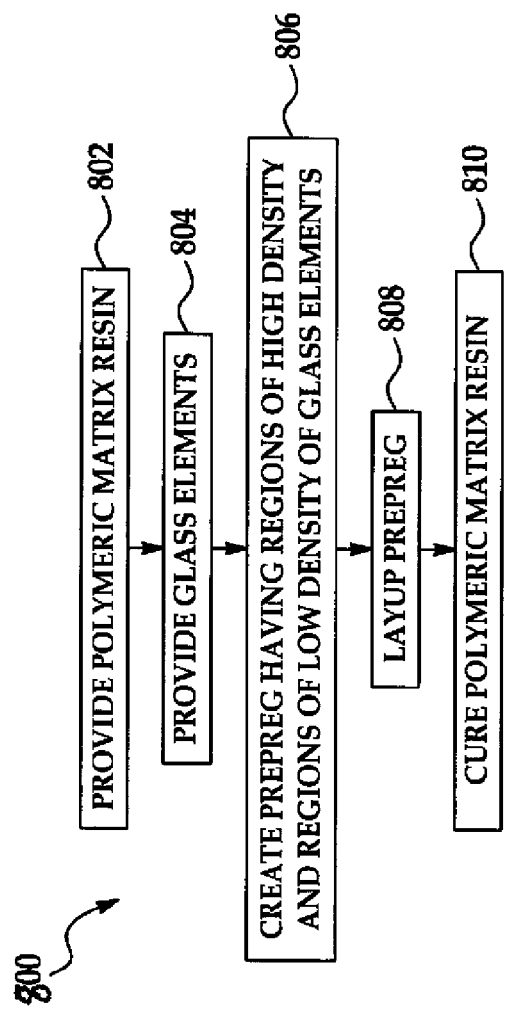
FIG. 8 is a flow diagram illustrating an illustrative method for reinforcing a composite material.

Referring next to FIG. 8, a flow diagram 800 which illustrates an illustrative method for reinforcing a composite material is shown. In block 802, a polymeric matrix resin is provided. The polymeric matrix resin may be optically transparent. In block 804, glass elements (fibers and/or ribbons) are provided. In block 806, prepreg is created by providing regions of high density of the glass elements and regions of low density of the glass elements in the polymeric matrix resin. In block 808, the prepreg is laid up. In block 810, the polymeric matrix resin is cured.

While not so limited, the transparent composite article is suitable for use as a component of a window assembly or other transparent device. Window assembly, as used herein, includes a window and components associated with the window, including the window, frames, mounting devices, or other associated equipment or devices. For example, the transparent composite article may be assembled into a window assembly for an aircraft or a transparent portion of an automobile, armored vehicle (e.g., a personnel carrier or transport) or boat (e.g., a glass-bottomed boat). In addition, the transparent composite article may be assembled into a window assembly for a stationary structure, such as a skyscraper or other architectural structure. Further still, in addition to window applications, the transparent composite article is suitable for use with riot gear or other personal protection, such as face shields or arm shields, wherein it is desirable to permit viewing through a ballistic-resistant material.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A structural window, comprising:
   a composite material including a window border and comprising:
   a polymeric matrix;
   at least one low-density region including a first plurality of glass elements having a first packing density provided in the polymeric matrix; and
   at least one high-density region including a second plurality of glass elements having a second packing density greater than the first packing density provided in the polymeric matrix.

2. The structural window of claim 1 wherein the high-density region defines the window border and the at least one low-density region is located inwardly of the at least one high-density region.

3. The structural window of claim 1 wherein the at least one low-density region defines the window border and the at least one high-density region is located inwardly of the at least one low-density region.

4. The structural window of claim 1 wherein the first plurality of glass elements and the second plurality of glass elements comprises a plurality of glass fibers or glass ribbons.

5. The structural window of claim 1 where a shape of the at least one low density region is selected from a list of square, rectangular, diamond-like, or any other polygon.

6. The structural window of claim 1 where the glass elements of the at least one high-density region are made of a different glass composition or with a different shape than said glass elements of said at least one low-density region.

* * * * *